United States Patent
Wu et al.

(10) Patent No.: US 12,200,803 B2
(45) Date of Patent: Jan. 14, 2025

(54) CONNECTION MANAGEMENT METHOD, TERMINAL, AND NETWORK SIDE DEVICE

(71) Applicant: VIVO MOBILE COMMUNICATION CO., LTD., Guangdong (CN)

(72) Inventors: Yumin Wu, Dongguan (CN); Wei Bao, Dongguan (CN); Fei Yang, Dongguan (CN); Feng Zhu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 414 days.

(21) Appl. No.: 17/378,617

(22) Filed: Jul. 16, 2021

(65) Prior Publication Data

US 2021/0345442 A1 Nov. 4, 2021

Related U.S. Application Data

(63) Continuation of application No. PCT/CN2020/072701, filed on Jan. 17, 2020.

(30) Foreign Application Priority Data

Jan. 18, 2019 (CN) .......................... 201910108473.6

(51) Int. Cl.
*H04W 76/25* (2018.01)
*H04W 8/24* (2009.01)
*H04W 76/11* (2018.01)
H04W 88/06 (2009.01)

(52) U.S. Cl.
CPC ............. *H04W 76/25* (2018.02); *H04W 8/24* (2013.01); *H04W 76/11* (2018.02); *H04W 88/06* (2013.01)

(58) Field of Classification Search
CPC ....... H04W 76/25; H04W 8/24; H04W 76/11; H04W 88/06; H04W 8/08; H04W 8/183; H04W 76/16; H04W 8/26; H04W 8/205; H04W 72/21

See application file for complete search history.

(56) References Cited

U.S. PATENT DOCUMENTS

| | | | |
|---|---|---|---|
| 2011/0149912 A1 | 6/2011 | Jung et al. | |
| 2013/0324107 A1* | 12/2013 | Lindoff | H04W 24/10 455/422.1 |
| 2014/0128069 A1* | 5/2014 | Xing | H04W 36/0079 455/437 |

(Continued)

FOREIGN PATENT DOCUMENTS

| | | |
|---|---|---|
| CN | 103209403 A | 7/2013 |
| CN | 103370963 A | 10/2013 |

(Continued)

OTHER PUBLICATIONS

Supplementary European Search Report regarding Application No. 20741674.4-1215/3913947; PCT/CN2020/072701, dated Mar. 14, 2022.

(Continued)

*Primary Examiner* — Kan Yuen
(74) *Attorney, Agent, or Firm* — Harness, Dickey & Pierce, P.L.C.

(57) ABSTRACT

A connection management method includes: reporting working cell information of a second terminal identifier of N terminal identifiers to a network side device through a first terminal identifier of the N terminal identifiers.

16 Claims, 4 Drawing Sheets

Report working cell information of a second terminal identifier of N terminal identifiers to a network side device through a first terminal identifier of the N terminal identifiers — 201

(56) References Cited

U.S. PATENT DOCUMENTS

| | | | |
|---|---|---|---|
| 2014/0204927 A1* | 7/2014 | Horn | H04W 8/26 370/338 |
| 2015/0029879 A1* | 1/2015 | Chou | H04B 7/0686 370/252 |
| 2015/0079939 A1* | 3/2015 | Naka | H04W 12/04 455/411 |
| 2015/0350988 A1* | 12/2015 | Himayat | H04W 36/22 370/331 |
| 2016/0100449 A1* | 4/2016 | Jang | H04W 76/16 370/252 |
| 2016/0219648 A1 | 7/2016 | Awoniyi-Oteri et al. | |
| 2017/0171902 A1 | 6/2017 | Tillman et al. | |
| 2017/0223625 A1* | 8/2017 | Liu | H04W 64/003 |
| 2017/0238163 A1* | 8/2017 | Chen | H04W 24/08 370/328 |
| 2018/0049056 A1* | 2/2018 | Chen | H04W 36/30 |
| 2019/0124546 A1* | 4/2019 | Phuyal | H04W 72/21 |
| 2020/0029378 A1* | 1/2020 | Xiao | H04W 76/15 |
| 2020/0084814 A1* | 3/2020 | Lindoff | H04W 64/00 |
| 2020/0221289 A1* | 7/2020 | Lee | H04W 8/24 |

FOREIGN PATENT DOCUMENTS

| | | |
|---|---|---|
| CN | 103582074 A | 2/2014 |
| CN | 104168616 A | 11/2014 |
| CN | 106454965 A | 2/2017 |
| CN | 106604332 A | 4/2017 |
| CN | 108271210 A | 7/2018 |
| CN | 108696881 A | 10/2018 |

OTHER PUBLICATIONS

First Office Action of Chinese Priority Application No. 201910108473.6 dated Nov. 27, 2020. Translation provided by Bohui Intellectual Property.

Second Office Action of Chinese Priority Application No. 201910108473.6 dated Jun. 1, 2021. Translation provided by Bohui Intellectual Property.

International Search Report and Written Opinion of the International Searching Authority regarding International Patent Application No. PCT/CN2020/072701, dated Apr. 15, 2020. Translation provided by Bohui Intellectual Property.

First Office Action regarding Japanese Patent Application No. 2021-540219, dated Jul. 26, 2022. Translation provided by Bohui Intellectual Property.

Huawei, "Report of Email Discussio [98#43][LTE/TEI14] UE Overheating Problem", Document R2-1708219, 3GPP TSG-RAN WG2 #99, Aug. 21-25, 2017.

Vivo, "UE Radio Access Capabilities Change", Document R2-1811767 (Resubmission of R2-1809848), 3GPP TSG-RAN WG2 Meeting #103, Aug. 20-24, 2018.

* cited by examiner

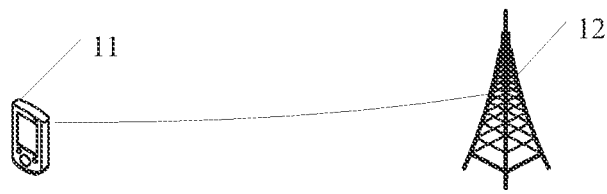

FIG. 1

Report working cell information of a second terminal identifier of N terminal identifiers to a network side device through a first terminal identifier of the N terminal identifiers — 201

FIG. 2

Receive working cell information of a second terminal identifier of N terminal identifiers that is reported by a terminal through a first terminal identifier of the N terminal identifiers of the terminal, wherein N is an integer greater than 1 — 301

FIG. 3

CONNECTION MANAGEMENT METHOD, TERMINAL, AND NETWORK SIDE DEVICE

CROSS-REFERENCE TO RELATED APPLICATIONS

This application is a Bypass Continuation Application of PCT/CN2020/072701 filed on Jan. 17, 2020, which claims priority to Chinese Patent Application No. 201910108473.6 filed on Jan. 18, 2019, which are incorporated herein by reference in their entirety.

TECHNICAL FIELD

The present disclosure relates to the field of communications technologies, and in particular, to a connection management method, a terminal, and a network side device.

BACKGROUND

A terminal (that is, a multi-SIM terminal) installed with multiple subscriber identity module (SIM) cards at the same time, or a terminal (that is, a multi-registration terminal) registered with networks for multiple times at the same time can work in multiple cells at the same time, such as camp and/or establish a connection in multiple cells at the same time.

At present, when a multi-SIM terminal or a multi-registration terminal works in multiple cells at the same time, performance of wireless transmission is poor due to capability limitation of the terminal.

SUMMARY

The embodiments of the present disclosure provide a connection management method, a terminal, and a network side device.

According to a first aspect, an embodiment of the present disclosure provides a connection management method, applied to a terminal. The connection management method includes:

reporting working cell information of a second terminal identifier of N terminal identifiers to a network side device through a first terminal identifier of the N terminal identifiers.

According to a second aspect, an embodiment of the present disclosure provides a connection management method, applied to a network side device. The connection management method includes:

receiving working cell information of a second terminal identifier of N terminal identifiers that is reported by a terminal through a first terminal identifier of the N terminal identifiers of the terminal, where N is an integer greater than 1.

According to a third aspect, an embodiment of the present disclosure further provides a terminal, including:

a first reporting module, configured to report working cell information of a second terminal identifier of N terminal identifiers to a network side device through a first terminal identifier of the N terminal identifiers.

According to a fourth aspect, an embodiment of the present disclosure further provides a network side device, including:

a second receiving module, configured to receive working cell information of a second terminal identifier of N terminal identifiers that is reported by a terminal through a first terminal identifier of the N terminal identifiers of the terminal, where N is an integer greater than 1.

According to a fifth aspect, an embodiment of the present disclosure further provides a terminal, including a processor, a memory, and a computer program stored in the memory and executable on the processor. The computer program, when executed by the processor, implements the steps of the foregoing connection management method.

According to a sixth aspect, an embodiment of the present disclosure further provides a network side device, including: a processor, a memory, and a computer program stored in the memory and executable on the processor. The computer program, when executed by the processor, implements the steps of the foregoing connection management method.

According to a seventh aspect, an embodiment of the present disclosure further provides a non-transitory computer readable storage medium. The non-transitory computer readable storage medium stores a computer program. The computer program, when executed by a processor, implements the steps of the foregoing connection management method applied to the terminal or the steps of the foregoing connection management method applied to the network side device.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

FIG. 1 is a structural diagram of a network system to which embodiments of the present disclosure can be applied;

FIG. 2 is a flowchart 1 of a connection management method according to an embodiment of the present disclosure;

FIG. 3 is a flowchart 2 of a connection management method according to an embodiment of the present disclosure;

DETAILED DESCRIPTION OF EMBODIMENTS

Figure 4:
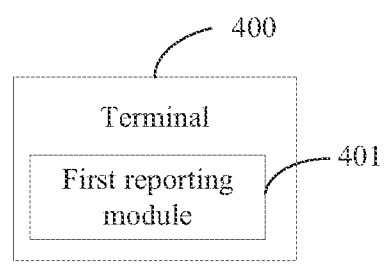
FIG. 4 is a structural diagram 1 of a terminal according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Terms "first" and "second" in this application are used to distinguish between similar objects, and do not need to be used to describe a specific order or sequence. In addition, terms "include", "have", and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/or" used in this application means at least one of the connected objects. For example, A and/or B and/or C represents the following seven cases: Only A exists, only B exists, only C exists, both A and B exist, both B and C exist, both A and C exist, or A, B, and C all exist.

Referring to FIG. 1, FIG. 1 is a structural diagram of a network system applicable to an embodiment of the present disclosure. As shown in FIG. 1, the network system includes a terminal 11 and a network side device 12. Communication may be performed between the terminal 11 and the network side device 12.

In this embodiment of the present disclosure, the terminal 11 may be also referred to as a user equipment (UE). For example, the terminal 11 may be a terminal-side device such as a mobile phone, a tablet personal computer, a laptop computer, a personal digital assistant (PDA), a mobile internet device (MID), a wearable device, or a vehicle-mounted device. It should be noted that a specific type of the terminal 11 is not limited in the embodiments of the present disclosure.

The network side device 12 may be a base station, a relay, an access point, or the like. The base station may be a base station of 5G and later versions, or a base station (for example, an evolved NodeB (eNB)) in another communications system. It should be noted that a specific type of the network side device 12 is not limited in the embodiments of the present disclosure.

For ease of description, the following describes some content in the embodiments of the present disclosure:

1. Multi-SIM UE and Multi-Registration UE

One UE can have multiple SIM cards at the same time (that, multi-SIM UE), or can be registered with a network at the same time for multiple times (that is, UE registered for multiple times). The UE can work in multiple cells at the same time, for example, camp on multiple cells at the same time and/or establish a connection in multiple cells at the same time. For example, cells on which the UE can camp at the same time and/or cells in which the UE establishes a connection at the same time can be same cells or different cells. Optionally, radio technology types of different cells can be the same, or can be different. Exemplarily, the UE can establish a connection in cell 1 and cell 2 at the same time. A radio technology type of cell 1 is 4G long term evolution (LTE), and a radio technology type of cell 2 is 5G new radio access technology (NR).

The UE can have different working states in multiple working cells. Exemplarily, the UE works in cell 1 and cell 2 at the same time. A working state of the UE in cell 1 can be one of an idle state (IDLE), an inactive state (INACTIVE), and a connected state (CONNECTED). A working state of the UE in cell 2 can be another of the idle state, the inactive state, and the connected state.

The UE may have different UE identifiers in multiple working cells. For example, a UE identifier of the UE in cell 1 includes: system architecture evolution-temporary mobile station identifier (S-TMSI) 1, and a UE identifier of the UE in cell 2 includes: S-TMSI2.

2. UE Band Capability

Different UEs can support different band capabilities and can include at least one of:

a band (for example, Band1) supported by the UE;

a combination of bands (for example, Band1+Band2) supported by the UE;

"The combination of bands supported by the UE" may include at least one of the following:

a combination of synchronous bands supported by the UE; or a combination of non-synchronous bands supported by the UE.

"The combination of synchronous bands" means that when the UE works in multiple cells (or frequencies) at the same time, the multiple cells (or frequencies) need to be in a synchronized state, for example: subframe boundary values (or slot boundary values) of multiple cells need to meet a synchronization requirement.

"The combination of non-synchronous bands" means that when the UE works in multiple cells (or frequencies) at the same time, the multiple cells (or frequencies) may be in a non-synchronized state, for example: subframe boundary values (or slot boundary values) of multiple cells may not meet a synchronization requirement.

For "the combination of non-synchronous bands", it is considered that the UE also supports a synchronous working state by default, that is, for "the combination of non-synchronous bands", multiple cells of the combination of bands in which the UE works at the same time can also in the synchronized state.

In practical applications, a deviation value of the subframe boundary value (or slot boundary value) may be compared with a preset value, to determine whether the subframe boundary value (or slot boundary value) meets the synchronization requirement. For example, if the deviation value of the subframe boundary value (or slot boundary value) is less than or equal to the preset value, the subframe boundary value (or slot boundary value) meets the synchronization requirement; if the deviation value of the subframe boundary value (or slot boundary value) is greater than the preset value, the subframe boundary value (or slot boundary value) does not meet the synchronization requirement. In practical applications, the preset value can be 30.26 seconds, but it is not limited to this.

It should be noted that in the embodiments of the present disclosure, the terminal includes the N terminal identifiers, and N is an integer greater than 1.

Types of the N terminal identifiers can include at least one of: a SIM card number; an international mobile subscriber identity (IMSI); a temporary mobile subscriber identity (TMSI); an S-TMSI; a 5G-S-TMSI; or a radio network temporary identity (RNTI).

Working state types of the N terminal identifiers can include at least one of the connected state, the idle state, or the inactive state. In some embodiments, the N terminal identifiers can be in a same working state or different working states. Exemplarily, terminal identifier 1 of the N terminal identifiers is in the idle state; and terminal identifier 2 of the N terminal identifiers is in the connected state.

In some embodiments, the terminal can obtain the N terminal identifiers from the network side device. Exemplarily, the terminal obtains the N terminal identifiers by registering (or attaching) Q SIM cards with the network side device for multiple times, where Q is an integer greater than or equal to 1.

In addition, in the embodiments of the present disclosure, the working cell of the terminal identifier can be understood as: a cell in which the terminal works through the terminal identifier. Exemplarily, if the terminal identifier is a SIM card number, a working cell of the SIM card number can be understood as: a cell on which the terminal camps or to which the terminal is connected through a SIM card corresponding to the SIM card number.

The working status of the terminal identifier can be understood as: a working status of the terminal when the terminal works in the cell through the terminal identifier.

The following describes the connection management method in the embodiments of the present disclosure.

Referring to FIG. 2, FIG. 2 is a flowchart 1 of a connection management method according to an embodiment of the present disclosure. The connection management method shown in FIG. 2 may be applied to a terminal.

As shown in FIG. 2, the connection management method in this embodiment may include the following steps:

Step 201: Report working cell information of a second terminal identifier of N terminal identifiers to a network side device through a first terminal identifier of the N terminal identifiers.

In this embodiment, the first terminal identifier and the second terminal identifier are different terminal identifiers.

In some embodiments, the first terminal identifier can be: a terminal identifier of the N terminal identifiers that is connected to the network side device; or a terminal identifier of the N terminal identifiers that will be connected to the network side device.

In practical applications, if the terminal initiates a process of connecting with the network side device through a terminal identifier, the terminal identifier can be regarded as a terminal identifier that will be connected to the network side device. In addition, for the terminal identifier that will be connected to the network side device, the working cell information of the second terminal identifier can be carried in a RRC setup request message and/or a RRC setup complete message for reporting.

The second terminal identifier can include: at least one of a terminal identifier in the connected state, a terminal identifier in the idle state, or a terminal identifier in the inactive state. For the terminal identifier in the connected state, the terminal can be connected to a network side device other than the network side device through the terminal identifier.

In this embodiment, the working cell information of the second terminal identifier can be understood as related information of the working cell of the second terminal identifier.

In practical applications, the number of the second terminal identifier can be greater than or equal to 1. When the number of the second terminal identifier is equal to 1, the working cell of the second terminal can be one or more working cells of one terminal identifier. When the number of the second terminal identifier is greater than 1, the working cell of the second terminal can be one or more working cells of multiple terminal identifiers.

In addition, for the second terminal identifier in the connected state, the working cell of the second terminal identifier can indicate a serving cell of the second terminal identifier, a target cell to be handed over, or a target cell to be changed.

Exemplarily, the working cell of the second terminal identifier in the connected state may be a target cell 2 to be handed over or a target secondary cell (SCell)-2 to be added. For the second terminal identifier in the idle state or the inactive state, the working cell of the second terminal identifier can indicate a camping cell of the second terminal identifier, a target cell to be selected, or a target cell to be reselected.

Optionally, the working cell information of the second terminal identifier may include at least one of:

a frequency corresponding to the working cell of the second terminal identifier;

a band corresponding to the working cell of the second terminal identifier;

a band combination corresponding to the working cell of the second terminal identifier;

a cell identifier of the working cell of the second terminal identifier;

a cell group identifier of a cell group of the working cell of the second terminal identifier;

a terminal identifier corresponding to the working cell of the second terminal identifier;

a radio technology identifier corresponding to the working cell of the second terminal identifier; or synchronization status information of the working cell of the second terminal identifier.

In some embodiments, the synchronization status information of the working cell of the second terminal identifier can be understood as: synchronization status information of the working cell of the second terminal identifier and a working cell of another terminal identifier of the N terminal identifiers other than the second terminal identifier. The synchronization status information is used to indicate: whether the working cell of the second terminal identifier is synchronized with the working cell of the another terminal identifier.

Exemplarily, if the working cell 1 of the terminal identifier 1 is synchronized with the working cell 2 of the terminal identifier 2, the synchronization status information can indicate that the working cell 1 of the terminal identifier 1 is synchronized with the working cell 2 of the terminal identifier 2. If the working cell 1 of the terminal identifier 1 is not synchronized with the working cell 2 of the terminal identifier 2, the synchronization status information can indicate that the working cell 1 of the terminal identifier 1 is not synchronized with the working cell 2 of the terminal identifier 2.

For example, the synchronization status information may include: identification information of the working cell of the second terminal identifier and the working cell of the another terminal identifier, and indication information used to indicate whether the working cell of the second terminal identifier is synchronized with the working cell of the another terminal identifier. Exemplarily, if the working cell of the second terminal identifier and the working cell of the another terminal identifier include cell a, cell b, and cell c, the synchronization status information can include identification information of cell a, cell b, and cell c, and indication information used to indicate whether cell a, cell b, and cell c are synchronized.

In addition, for other information of the working cell of the second terminal identifier, for example, the frequency can be an absolute radio frequency channel number (ARFCN)-1. The band can be: Band-1. The combination of bands can be: Band-1+Band-2. A cell identifier can be a physical cell identifier (PCI) and/or a cell global identifier (CGI). A cell group can be: a master cell group (MCG) or secondary cell group (SCG).

A radio technology identifier can be: code division multiple access (CDMA), CDMA2000, global system for mobile communications (GSM)/enhanced data rates for GSM evolution (EDGE) radio access network (GERAN), LTE, universal terrestrial radio access network (UTRAN) (for example, Wideband Code Division Multiple Access (WCDMA) or Time Division-Synchronous Code Division Multiple Access (TDS-GDMA)), the fifth-generation new radio (NR), and the like.

In the connection management method of this embodiment, the terminal reports working cell information of a second terminal identifier of N terminal identifiers to a network side device through a first terminal identifier of the N terminal identifiers. In this way, the network side device can obtain the capability of the terminal based on the working cell information of the second terminal identifier of the terminal, and transmit data within the capability of the terminal, thereby improving performance of wireless transmission.

During implementation, optionally, the reporting working cell information of a second terminal identifier of N terminal identifiers to a network side device through a first terminal identifier of the N terminal identifiers includes:

when a preset condition is satisfied, reporting the working cell information of the second terminal identifier to the network side device through the first terminal identifier of the N terminal identifiers.

The preset condition can include multiple forms.

Implementation 1:

In this implementation, optionally, the preset condition includes a first preset sub-condition, and the first preset sub-condition is: allowing reporting the working cell information of the second terminal identifier of the N terminal identifiers through the first terminal identifier.

Optionally, the first preset sub-condition may be configured by a network side device and/or predefined by a protocol.

In some embodiments, the first preset sub-condition may be determined based on a number of terminal identifiers of the N terminal identifiers that is connected to the network side device; and a number of terminal identifiers of the N terminal identifiers that will be connected to the network side device.

For the scenario where the number of terminal identifiers of the N terminal identifiers that are connected to the network side device and the number of terminal identifiers that will be connected to the network side device are equal to 1, the first terminal identifier is a terminal identifier of the N terminal identifiers that is connected to the network side device or the terminal identifier that will be connected to the network side device. Therefore, in one implementation, the first preset sub-condition can be predefined through the protocol. This can reduce signaling overheads. In another implementation, the first preset sub-condition can be configured by the network side device. This can improve the flexibility of reporting the working cell information of the second terminal identifier.

For the scenario where the number of terminal identifiers of the N terminal identifiers that are connected to the network side device and the number of terminal identifiers that will be connected to the network side device are greater than 1, the first terminal identifier is one of a terminal identifier of the N terminal identifiers that is connected to the network side device or the terminal identifier that will be connected to the network side device. Therefore, in one implementation, the first preset sub-condition can be configured by the network side device or predefined in a protocol. Exemplarily, it is predefined in a protocol as follows: allowing using all terminal identifiers connected to the network side device and terminal identifiers that will be connected to the network side device to report the working cell information of the second terminal identifier. Optionally, to reduce signaling overheads, the network side device can further instruct the terminal to report the working cell information of the second terminal identifier through the first terminal identifier of the above terminal identifiers. In another implementation, the first preset sub-condition can be configured directly by the network side device.

In actual application, optionally, in the case where the preset condition is configured by the network side device, before the reporting working cell information of a second terminal identifier to a network side device through a first terminal identifier of the N terminal identifiers, the method further includes:

receiving first indication information and/or second indication information sent by the network side device;

where the first indication information is used to indicate whether to allow the terminal to report the working cell information of the second terminal identifier through the first terminal identifier; and the second indication information is used to indicate whether the network side device supports receiving of the working cell information of the second terminal identifier that is reported through the first terminal identifier.

In some embodiments, the first indication information and/or the second indication information may be transmitted through system information (such as a system information block (SIB) x) or dedicated signaling (a radio resource control (RRC) reconfiguration message).

For the scenario where the terminal only receives the first indication information, only when the terminal detects that the first indication information indicates that the terminal is allowed to report the working cell information of the second terminal identifier through the first terminal identifier, the terminal reports the working cell information of the second terminal identifier through the first terminal identifier.

For the scenario where the terminal only receives the second indication information, only when the terminal detects that the second indication information indicates that the network side device supports receiving of the working cell information of the second terminal identifier that is reported through the first terminal identifier, that is, indicates that the network side device has the ability to receive the working cell information of the second terminal identifier that is reported through the first terminal identifier, the terminal reports the working cell information of the second terminal identifier through the first terminal identifier.

For the scenario where the first indication information and the second indication information are received, only when the terminal detects that the second indication information indicates that the network side device supports receiving of the working cell information of the second terminal identifier that is reported through the first terminal identifier, and the first indication information indicates that the terminal is allowed to report the working cell information of the second terminal identifier through the first terminal identifier, the terminal reports the working cell information of the second terminal identifier through the first terminal identifier.

Implementation 2:

In this embodiment, optionally, on the basis of implementation 1, the preset condition further includes a second preset sub-condition, and the second preset sub-condition can include at least one of:

it is detected that a working cell of the second terminal identifier has changed or will change;

it is detected that a working cell of the first terminal identifier has changed or will change;

it is detected that a connection state of the second terminal identifier has changed or will change; or it is detected that a connection state of the first terminal identifier has changed or will change.

The above "will change" can be understood as: no change has occurred, but a change will occur.

Exemplarily, for a terminal identifier in an idle state or an active state, if it is detected that the terminal initiates a cell selection or cell reselection process through the terminal identifier, it can be regarded as: it is detected that the working cell of the terminal identifier will change. For example: for UE in the idle state, the UE is preparing to change a camped cell by reselecting to a target cell. At this time, the camped cell of the UE may not be changed.

For a terminal identifier in the connected state, if the terminal receives a switching command of the terminal identifier that is sent by the network side device or the terminal initiates a switching process through the terminal identifier, it can be regarded as: it is detected that the working cell of the terminal identifier will change. For example, for UE in the connected state, the UE receives a switching command sent by the network side and is preparing to switch to a target cell, but the cell in which the UE currently works has not changed.

In some embodiments, an example in which it is detected that the working cell of the second terminal identifier is changed or will be changed is: example 1 in which the UE (UE-ID-2) in the connected state adds a new serving cell (for example, SCell-1 is added and/or a serving cell group SCG is added), or switches to a target cell Cell-2. In example 2, UE (UE-ID-2) in the idle state (or inactive state) reselects Cell-2.

An example in which it is detected that the working cell of the first terminal identifier is changed or will be changed is: example 1 in which the UE in the connected state (UE-ID-1) adds a new serving cell (for example, SCell-1 is added and/or a serving cell group SCG is added), or switches to a target cell Cell-2.

An example in which it is detected that the connection state of the second terminal identifier has changed or will change is: the UE (UE-ID-2) in the connected state switches from the connected state to the idle state (or inactive state).

An example in which it is detected that the connection state of the first terminal identifier has changed or will change is: the UE (UE-ID-1) in the idle state (or inactive state) switches from the idle state to the connected state. In this scenario, the UE can report the working cell information of the second terminal identifier in an RRC setup request (RRC Setup Request) and/or an RRC setup complete (RRC Setup Complete) message.

It should be noted that the first preset sub-condition in this implementation is the same as the first preset sub-condition in implementation 1. For details, refer to the description in implementation 1, which is not repeated herein.

In addition, the second preset sub-condition in this implementation can also be configured by the network side device and/or predefined, which is not limited by the embodiments of the present disclosure.

In the embodiments of the present disclosure, to avoid that the terminal frequently reports the working cell information of the second terminal identifier, after the reporting working cell information of a second terminal identifier of N terminal identifiers to a network side device through a first terminal identifier of the N terminal identifiers, optionally, the method further includes:

starting a target timer;
where during operation of the target timers, the terminal stops reporting the working cell information of the second terminal identifier to the network side device through the first terminal identifier of the N terminal identifiers.

Configuration information of the target timer, for example, timing duration, can be configured by the network side device or predefined in a protocol, and the embodiments of the present disclosure are not limited thereto.

In this way, by starting the target timer, the terminal can stop reporting the working cell information of the second terminal identifier during the operation of the target timer, which not only can reduce power consumption of the terminal, but also can reduce signaling overheads.

In the embodiments of the present disclosure, optionally, the method may further include:
reporting, to the network side device, working capability information of M terminal identifiers of the N terminal identifiers supported by the terminal;
where M is an integer greater than 1 and less than or equal to N.

For example, the working capability information of the M terminal identifiers can be understood as: working capability information that the M terminal identifiers work at the same time.

It should be noted that the embodiments of the present disclosure do not limit a time sequence relationship between reporting the working cell information of the second terminal identifier and reporting the working capability information of the M terminal identifiers by the terminal. For example, the terminal can report the working cell information and the working capability information at the same time; or can also report the working capability information first, and then report the working cell information; or can report the working cell information first, and then report the working capability information.

In this way, the network side device can combine the working cell information of the second terminal identifier and the working capability information of the M terminal identifiers to obtain the capability of the terminal. This can improve the accuracy of the capability of the terminal that is obtained by the network side device, thereby further improving wireless transmission performance.

Optionally, the working capability information of M terminal identifiers of the N terminal identifiers supported by the terminal includes at least one of:
a combination of radio network technologies supported by the terminal;
a combination of bands supported by the terminal; or
a combination of frequencies supported by the terminal.

For example, the combination of radio network technologies supported by the terminal can be understood as: a combination of radio network technologies in which the M terminal identifiers work at the same time and that are supported by the terminal; the combination of bands supported by the terminal can be understood as: a combination of bands in which the M terminal identifiers work at the same time and that are supported by the terminal; the combination of frequencies supported by the terminal can be understood as: a combination of frequencies in which the M terminal identifiers work at the same time and that are supported by the terminal.

Optionally, a radio network technology type of the combination of radio network technologies includes at least one of:
code division multiple access CDMA; CDMA2000; GSM/EDGE radio access network GERAN; universal terrestrial radio access network UTRAN; evolved UTRAN; fifth-generation new radio; radio network Wi-Fi; or Bluetooth.

In some embodiments, radio network technology types of the combination of radio network technologies in which the M terminal identifiers work at the same time may be the same or different.

The combination of frequencies supported by the terminal is: a combination of bands of multiple working cells in which the M terminal identifiers can work at the same time. Optionally, the combination of bands includes at least one of a combination of synchronous bands or a combination of non-synchronous bands.

"The combination of synchronous bands" means that when the UE works in multiple cells (or frequencies) at the same time, the multiple cells (or frequencies) need to be in a synchronized state. In some examples, subframe boundaries of multiple cells may need to meet the synchronization requirement, for example, a deviation value of a subframe boundary value or a slot boundary value is less than or equal to 30.26 seconds.

"The combination of non-synchronous bands" means that when the UE works in multiple cells (or frequencies) at the same time, the multiple cells (or frequencies) may be in a non-synchronized state. In some other examples, subframe boundaries of multiple cells may not need to meet the synchronization requirement, for example, a deviation value of a subframe boundary value or a slot boundary value is greater than 30.26 seconds.

It should be noted that after the terminal reports the working capability information of the M terminal identifiers, the terminal can also start a timer. During the running of the timer, the terminal stops reporting the working capability information of the M terminal identifiers, to avoid that the terminal frequently reports the working capability information of the M terminal identifiers, thereby reducing signaling overheads.

Referring to FIG. 3, FIG. 3 is a flowchart 2 of a connection management method according to an embodiment of the present disclosure. The connection management method shown in FIG. 3 is applied to a network side device.

As shown in FIG. 3, the connection management method in this embodiment includes the following steps:

Step 301: Receive working cell information of a second terminal identifier of N terminal identifiers that is reported by a terminal through a first terminal identifier of the N terminal identifiers of the terminal, where N is an integer greater than 1.

In the connection management method of this embodiment, the network side device can obtain the capability of the terminal based on the received working cell information of the second terminal identifier that is sent by the terminal, and therefore can transmit data within the capability of the terminal, thereby improving performance of wireless transmission.

Optionally, before the receiving working cell information of a second terminal identifier of N terminal identifiers that is reported by a terminal through a first terminal identifier of the N terminal identifiers of the terminal, the method further includes:

sending first indication information to the terminal, where the first indication information indicates allowing the terminal to report the working cell information of the second terminal identifier through the first terminal identifier; and/or sending second indication information to the terminal, where the second indication information indicates that the network side device supports receiving of the working cell information of the second terminal identifier that is reported by the terminal through the first terminal identifier.

It should be noted that it is predefined in the protocol: in the implementation in which the terminal is allowed to report the working cell information of the second terminal identifier through the first terminal identifier, the network side device may not send the first indication information and the second indication information, to reduce signaling overheads.

Optionally, the working cell information of the second terminal identifier includes at least one of:
- a frequency corresponding to the working cell of the second terminal identifier;
- a band corresponding to the working cell of the second terminal identifier;
- a band combination corresponding to the working cell of the second terminal identifier;
- a cell identifier of the working cell of the second terminal identifier;
- a cell group identifier of a cell group of the working cell of the second terminal identifier;
- a terminal identifier corresponding to the working cell of the second terminal identifier;
- a radio technology identifier corresponding to the working cell of the second terminal identifier; or
- synchronization status information of the working cell of the second terminal identifier.

Optionally, the method further includes:
receiving working capability information of M terminal identifiers of the N terminal identifiers supported by the terminal; where the working capability information is reported by the terminal;
where M is an integer greater than 1 and less than or equal to N.

Optionally, the working capability information of M terminal identifiers of the N terminal identifiers supported by the terminal includes at least one of:
- a combination of radio network technologies supported by the terminal;
- a combination of bands supported by the terminal; or
- a combination of frequencies supported by the terminal.

Optionally, a radio network technology type of the combination of radio network technologies includes at least one of:
- code division multiple access CDMA; CDMA2000; GSM/EDGE radio access network GERAN; universal terrestrial radio access network UTRAN; evolved UTRAN; fifth-generation new radio; radio network Wi-Fi; or Bluetooth.

Optionally, the combination of bands includes at least one of a combination of synchronous bands or a combination of non-synchronous bands.

Optionally, the network side device is a source network side device; and after the receiving working cell information of a second terminal identifier of N terminal identifiers that is reported by a terminal through a first terminal identifier of the N terminal identifiers of the terminal, the method further includes:

forwarding the working cell information of the second terminal identifier of the N terminal identifiers to a target network side device.

In some embodiments, after the network side device receives the working cell information of the second terminal identifier, the network side device can forward the working cell information of the second terminal identifier to the target network side device during movement.

Exemplarily, a gNB (that is, an NR Node B or an NR node) 1 sends the information to a target gNB2, or a master node (MN), or a secondary node (SN) during a switching process. The information is sent to a target SN during a process of adding or changing an SN.

In this way, the target network side device can obtain the capability of the terminal based on the working cell information of the second terminal identifier, and therefore can transmit data within the capability of the terminal, thereby improving performance of wireless transmission.

It should be noted that when the network side device is a source network side device, after the receiving working capability information of M terminal identifiers of the N terminal identifiers supported by the terminal, where the working capability information is reported by the terminal, the method may further include:

forwarding the working cell information of the M terminal identifiers to the target network side device.

In this way, the target network side device can obtain the capability of the terminal according to the working cell information of the second terminal identifier and the working cell information of the M terminal identifiers. This further improves the accuracy of the capability of the terminal that is obtained, thereby further improving wireless transmission performance.

It should be noted that this embodiment serves as an implementation of the network side device corresponding to the foregoing method embodiment. Therefore, reference may be made to related descriptions in the foregoing method embodiment, and same beneficial effects can be achieved. To avoid repeated description, details are not described herein again.

The plurality of optional implementations described in the embodiments of the present disclosure may be implemented in combination with each other or may be implemented separately. This is not limited in the embodiments of the present disclosure.

For the convenience of understanding, an example is described as follows, and the connection management method may include the following steps:

Step 1: UE obtains multiple pieces of identification information from the network side (for example, the UE obtains UE (UE-ID-1) and UE (UE-ID-2) by registering with or attaching to the network side for multiple times with one or more SIM cards).

Types of the multiple pieces of identification information include any one or a combination of multiple of the following: an SIM card number; an IMSI; a TMSI; an S-TMSI; a 5G-S-TMSI; and an RNTI.

Multiple identifiers of the UE may be in the same or different working states. For example, the UE (UE-ID-1) is in an idle state, and the UE (UE-ID-2) is in a connected state. UE (UE-ID-1) can be understood as: UE-ID-1 of UE, and UE (UE-ID-2) can be understood as: UE-ID-2 of UE. UE-ID-1 and UE-ID-2 are terminal identifiers.

Step 2: The network side configures or a protocol specifies whether the UE in the connected state is allowed to report working cell information of another UE identifier. The UE in the connected state can be understood as: a UE identifier in the connected state.

Example 1: The network side uses system information (such as SIBx) or dedicated signaling (such as an RRC reconfiguration message) to indicate whether UE in the connected state is allowed to report a working cell of another UE.

Example 2: The network side uses system information (such as SIBx) or dedicated signaling (such as an RRC reconfiguration message) to indicate network side device capability information, and indicate whether to support the receiving of the working cell information of another UE identifier that is reported by the UE in the connected state. The UE can report only when the network side device indicates "support the receiving of the working cell information of another UE identifier that is reported by UE in the connected state".

In addition, the network side configures and/or a protocol specifies a prohibit timer configuration (for example, duration of a prohibit timer). During running of the timer, the UE is prohibited from reporting the working cell information of another UE identifier. The prohibit timer can be understood as the above target timer.

Step 3.x: According to step 2, when at least one identifier of UE identifiers is in the connected state (that is, CONNECTED) (for example, the UE (UE-ID-1) is in the connected state), the UE identifier is used to report one or more pieces of working cell information of another UE identifier.

The "working cell information" includes one or any combination of multiple of the following:

a frequency corresponding to the cell (for example, ARFCN-1);

a band corresponding to the cell (for example, Band-1);

a combination of bands corresponding to the cell (for example, Band-1+Band-2);

a cell identifier (for example, a PCI-1 and/or a CGI); and a cell group identifier of the cell (for example, an MCG or an SCG);

UE identifier information corresponding to the cell (for example, the UE corresponding to cell 1 (UE-ID-2));

and a radio technology identifier corresponding to the cell (for example, CDMA; CDMA2000; GERAN; LTE; UTRAN (for example, WCDMA or TDS-CDMA); 5G NR, and the like).

In addition, the UE identifier can be used to report a synchronization status of one or more working cells of another UE identifier and the working cell of the UE identifier. For example, working cell 1 of UE (UE-ID-1) and working cell 2 of UE (UE-ID-2) are synchronized, and the UE reports synchronization indication information to indicate that the working cell 1 of the UE (UE-ID-1) and the working cell 2 of the UE (UE-ID-2) are synchronized. For example, working cell 1 of UE (UE-ID-1) and working cell 2 of UE (UE-ID-2) are non-synchronous, and the UE reports synchronization indication information to indicate that working cell 1 of UE (UE-ID-1) and working cell 2 of UE (UE-ID-2) are non-synchronous.

The "working cell of another UE identifier" may be one or more working cells of one UE identifier, or may be one or more working cells of multiple UE identifiers.

The "working cell" of another UE identifier indicates a serving cell (or a target cell to be handed over (for example, a target cell 2 to be handed over) or a target cell to be changed (for example, a target SCell-2 (that is, a secondary cell (Secondary Cell, Scell) to be added)) for the UE in the connected state, and indicates a camped cell (or a target cell to be selected or reselected) for the UE identifier in the idle state or in the inactive state.

A triggering condition of "the UE identifier is used to report one or more pieces of working cell information of another UE identifier" includes any one or more of the following:

another UE identifier has changed or will change a working cell. In example 1, the UE in the connected state (UE-ID-2) adds a new serving cell (for example, SCell-1 is added and/or a serving cell group SCG is added), or switches to a target cell Cell-2. In example 2, UE (UE-ID-2) in the idle state (or inactive state) reselects Cell-2.

UE identifier used to report the information has changed or will change a working cell. In example 1, the UE in the connected state (UE-ID-1) adds a new serving cell (for example, SCell-1 is added and/or a serving cell group SCG is added), or switches to a target cell Cell-2.

Another UE identifier has changed or will change a connection state. For example: the UE (UE-ID-2) in the connected state switches from the connected state to the idle state (or inactive state).

UE identifier used to report the information has changed or will change a connection state. For example: the UE (UE-ID-1) in the idle state (or inactive state) switches from the idle state to the connected state. In this case, the UE can report the information in an RRC setup request (RRC Setup Request) and/or an RRC setup complete (RRC Setup Complete) message.

Furthermore, if the network side device configures or a protocol specifies a prohibit timer configuration, the UE can start the prohibit timer after reporting the information, and no longer triggers the reporting of the information during the running of the timer.

Step 3.y: The UE can report capability information that the UE supports multiple UE identifiers to work at the same time.

"The capability information that multiple UE identifiers work at the same time" includes one or any combination of multiple of the following:

a combination of radio network technologies supported by the UE (for example, LTE+5G NR, and 5G+5G); a combination of bands (for example, Band1+Band2) supported by the UE; and a combination of frequencies (for example, F1+F2) supported by the UE.

A radio network technology type of the combination of radio network technologies includes one or any combination of multiple of the following:

CDMA; CDMA2000; GERAN; E-UTRAN (for example, LTE); UTRAN (for example, WCDMA or TDS-CDMA); 5G NR; Wi-Fi; and Bluetooth.

Radio network technology types of the "combination of radio network technologies" may be the same or different.

The "combination of bands supported by the UE" is a combination of bands of multiple working cells in which the multiple UE identifiers can work at the same time. Optionally, the "combination of bands supported by the UE" may include:

a combination of synchronous bands supported by the UE; and a combination of non-synchronous bands supported by the UE.

"The combination of synchronous bands" means that when the UE works in multiple cells (or frequencies) at the same time, the multiple cells (or frequencies) need to be in a synchronized state. For example, subframe boundaries of multiple cells need to meet the synchronization requirement (for example, a deviation value of a subframe boundary is less than or equal to 30.26 s).

"The combination of non-synchronous bands" means that when the UE works in multiple cells (or frequencies) at the same time, the multiple cells (or frequencies) may be in a non-synchronized state. For example, subframe boundaries of multiple cells may not meet the synchronization requirement (for example, a deviation value of a subframe boundary is greater than 30.26 s).

Step 4: A network node that receives the information reported by the UE can send the information to a target node during movement.

In example 1: gNB1 sends this information to the target gNB2 during the handover process.

In example 2: An MN or an SN sends the information to a target SN during a process of adding or changing an SN.

The main innovations and protection points of this disclosure include at least the following:

When UE (such as UE (UE-ID-1) and UE (UE-ID-2)) that is registered with the network side device for multiple times works in one or more cells, a UE identifier in the connection state (CONNECTED) (this identifier includes: a SIM card identifier; an identifier that is registered by the UE with the network side device, or the like) is used to report working cell information of another UE identifier to the network side device. The "working cell information" may include at least one of:

a frequency; a band; a cell identifier; a cell group identifier of the cell; or UE identifier information corresponding to the cell.

The "working cell" may be one or more working cells of one UE identifier, or may be one or more working cells of multiple UE identifiers.

The present disclosure has at least the following beneficial effects:

In the connection management method of the present disclosure, when multi-SIM UE or registered for multiple times in a connected state works in multiple cells at the same time, the UE can establish a connection in a cell corresponding to a band or a combination of bands supported by the UE, so that the UE can work in the multiple cells at the same time (for example, receive or send a signal at the same time), thereby improving work reliability of the UE (for example, improving the wireless transmission performance of the terminal).

Referring to FIG. 4, FIG. 4 is a first structural diagram of a terminal according to an embodiment of the present disclosure. The terminal in this embodiment includes N terminal identifiers, where N is an integer greater than 1. As shown in FIG. 4, the terminal 400 includes:

a first reporting module 401, configured to report working cell information of a second terminal identifier of N terminal identifiers to a network side device through a first terminal identifier of the N terminal identifiers.

Optionally, the first reporting module is configured to:

when a preset condition is satisfied, report the working cell information of the second terminal identifier to the network side device through the first terminal identifier of the N terminal identifiers.

Optionally, the preset condition includes: allowing reporting the working cell information of the second terminal identifier of the N terminal identifiers through the first terminal identifier.

Optionally, the preset condition is configured by a network side device and/or predefined by a protocol.

Optionally, in the case where the preset condition is configured by the network side device, the terminal further includes:

a first receiving module, configured to: before reporting the working cell information of the second terminal identifier to the network side device through the first terminal identifier of the N terminal identifiers, receive first indication information and/or second indication information sent by the network side device;

where the first indication information is used to indicate whether to allow the terminal to report the working cell information of the second terminal identifier through the first terminal identifier; and the second indication information is used to indicate whether the network side device supports receiving of the working cell information of the second terminal identifier that is reported through the first terminal identifier.

Optionally, the preset condition further includes at least one of:
- it is detected that a working cell of the second terminal identifier has changed or will change;
- it is detected that a working cell of the first terminal identifier has changed or will change;
- it is detected that a connection state of the second terminal identifier has changed or will change; or
- it is detected that a connection state of the first terminal identifier has changed or will change.

Optionally, the terminal further includes:
- a start module, configured to: after working cell information of a second terminal identifier of N terminal identifiers is reported to a network side device through a first terminal identifier of the N terminal identifiers, start a target timer;
- where during operation of the target timer, the terminal stops reporting the working cell information of the second terminal identifier to the network side device through the first terminal identifier of the N terminal identifiers.

Optionally, the working cell information of the second terminal identifier includes at least one of:
- a frequency corresponding to the working cell of the second terminal identifier;
- a band corresponding to the working cell of the second terminal identifier;
- a band combination corresponding to the working cell of the second terminal identifier;
- a cell identifier of the working cell of the second terminal identifier;
- a cell group identifier of a cell group of the working cell of the second terminal identifier;
- a terminal identifier corresponding to the working cell of the second terminal identifier;
- a radio technology identifier corresponding to the working cell of the second terminal identifier; or
- synchronization status information of the working cell of the second terminal identifier.

Optionally, the terminal further includes:
- a second reporting module, configured to report, to the network side device, working capability information of M terminal identifiers of the N terminal identifiers supported by the terminal;
- where M is an integer greater than 1 and less than or equal to N.

Optionally, the working capability information of M terminal identifiers of the N terminal identifiers supported by the terminal includes at least one of:
- a combination of radio network technologies supported by the terminal;
- a combination of bands supported by the terminal; or
- a combination of frequencies supported by the terminal.

Optionally, a radio network technology type of the combination of radio network technologies includes at least one of:
- code division multiple access CDMA; CDMA2000; GSM/EDGE radio access network GERAN;
- universal terrestrial radio access network UTRAN; evolved UTRAN; fifth-generation new radio; radio network Wi-Fi; or Bluetooth.

Optionally, the combination of bands includes at least one of a combination of synchronous bands or a combination of non-synchronous bands.

The terminal 400 can implement each process implemented by the terminal in the foregoing method embodiments of the present disclosure, and achieve same beneficial effects. To avoid repetition, details are not described herein again.

Figure 5:
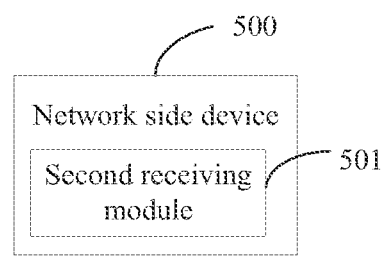
FIG. 5 is a structural diagram 1 of a network side device according to an embodiment of the present disclosure.

Referring to FIG. 5, FIG. 5 is a first structural diagram of a network side device according to an embodiment of the present disclosure. As shown in FIG. 5, the network side device 500 includes:
- a second receiving module 501, configured to receive working cell information of a second terminal identifier of N terminal identifiers that is reported by a terminal through a first terminal identifier of the N terminal identifiers of the terminal, where N is an integer greater than 1.

Optionally, the network side device further includes:
- a first sending module, configured to: before working cell information of a second terminal identifier of N terminal identifiers that is reported by a terminal through a first terminal identifier of the N terminal identifiers of the terminal is received, send first indication information to the terminal, where the first indication information indicates allowing the terminal to report the working cell information of the second terminal identifier through the first terminal identifier; and/or
- a second sending module, configured to: before working cell information of a second terminal identifier of N terminal identifiers that is reported by a terminal through a first terminal identifier of the N terminal identifiers of the terminal is received, send second indication information to the terminal, where the second indication information indicates that the network side device supports receiving of the working cell information of the second terminal identifier that is reported through the first terminal identifier.

Optionally, the working cell information of the second terminal identifier includes at least one of:
- a frequency corresponding to the working cell of the second terminal identifier;
- a band corresponding to the working cell of the second terminal identifier;
- a band combination corresponding to the working cell of the second terminal identifier;
- a cell identifier of the working cell of the second terminal identifier;
- a cell group identifier of a cell group of the working cell of the second terminal identifier;
- a terminal identifier corresponding to the working cell of the second terminal identifier;
- a radio technology identifier corresponding to the working cell of the second terminal identifier; or synchronization status information of the working cell of the second terminal identifier.

Optionally, the network side device further includes:
- a third receiving module, configured to: receive working capability information of M terminal identifiers of the N terminal identifiers supported by the terminal; where the working capability information is reported by the terminal;
- where M is an integer greater than 1 and less than or equal to N.

Optionally, the working capability information of M terminal identifiers of the N terminal identifiers supported by the terminal includes at least one of:
- a combination of radio network technologies supported by the terminal;
- a combination of bands supported by the terminal; or a combination of frequencies supported by the terminal.

Optionally, a radio network technology type of the combination of radio network technologies includes at least one of:
- code division multiple access CDMA; CDMA2000; GSM/EDGE radio access network GERAN;
- universal terrestrial radio access network UTRAN; evolved UTRAN; fifth-generation new radio; radio network Wi-Fi; or Bluetooth.

Optionally, the combination of bands includes at least one of a combination of synchronous bands or a combination of non-synchronous bands.

Optionally, the network side device is a source network side device; and
- the network side device further includes:
- a forwarding module, configured to: after working cell information of a second terminal identifier of N terminal identifiers that is reported by a terminal through a first terminal identifier of the N terminal identifiers of the terminal is received, forward the working cell information of the second terminal identifier of the N terminal identifiers to a target network side device.

The network side device 500 can implement each process implemented by the network side device in the foregoing method embodiments of the present disclosure, and achieve same beneficial effects. To avoid repetition, details are not described herein again.

Figure 6:
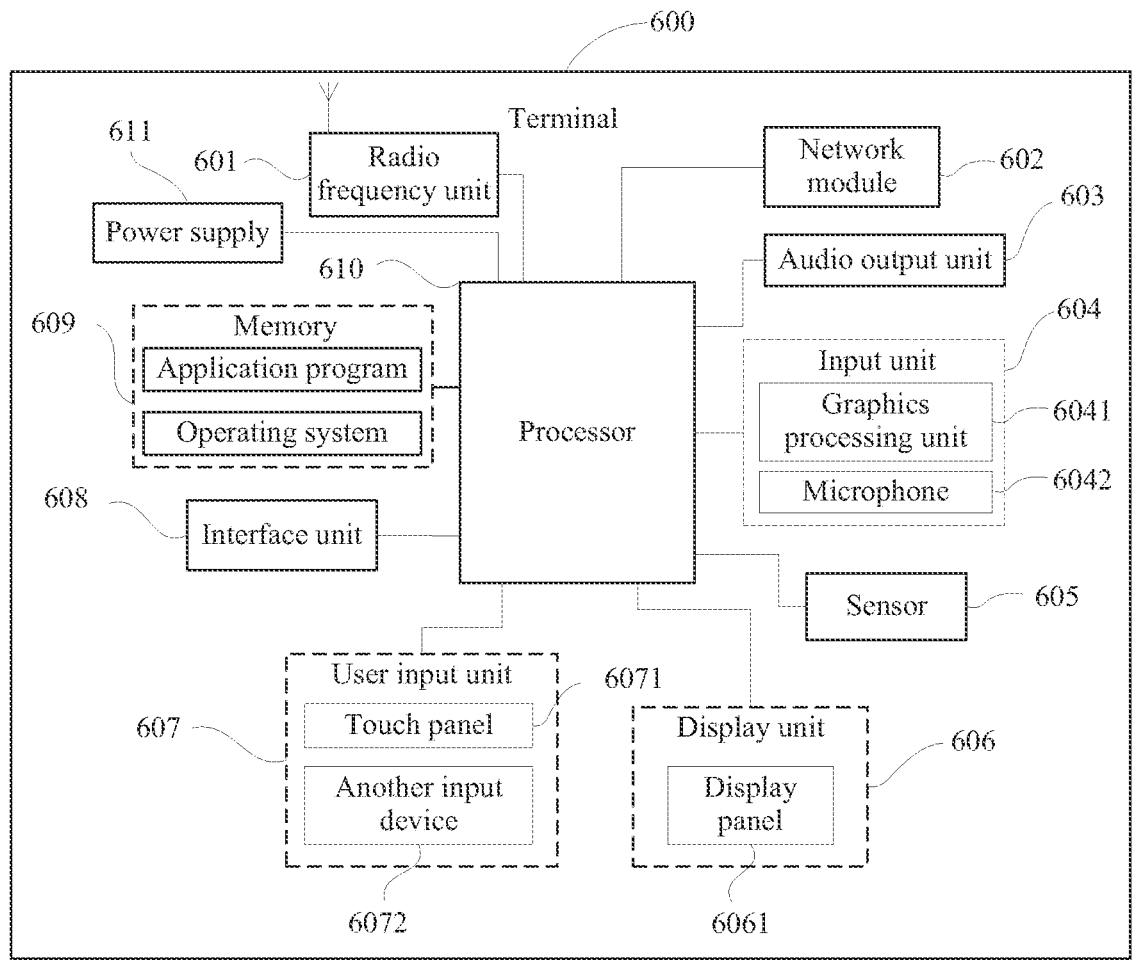
FIG. 6 is a structural diagram 2 of a terminal according to an embodiment of the present disclosure.

Referring to FIG. 6, FIG. 6 is a second structural diagram of a terminal according to an embodiment of the present disclosure. The terminal may be shown in a schematic diagram of a hardware structure of a terminal implementing the embodiments of the present disclosure. The terminal includes N terminal identifiers, and N is an integer greater than 1. As shown in FIG. 6, the terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and the like. A person skilled in the art may understand that the structure of the terminal shown in FIG. 6 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The radio frequency unit 601 is configured to:
report working cell information of a second terminal identifier of N terminal identifiers to a network side device through a first terminal identifier of the N terminal identifiers.

Optionally, the radio frequency unit 601 is further configured to:
when a preset condition is satisfied, report the working cell information of the second terminal identifier to the network side device through the first terminal identifier of the N terminal identifiers.

Optionally, the preset condition includes: allowing reporting the working cell information of the second terminal identifier of the N terminal identifiers through the first terminal identifier.

Optionally, the preset condition is configured by a network side device and/or predefined by a protocol.

Optionally, in the case where the preset condition is configured by the network side device, the radio frequency unit 601 is further configured to:
before reporting the working cell information of the second terminal identifier to the network side device through the first terminal identifier of the N terminal identifiers, receive first indication information and/or second indication information sent by the network side device;
where the first indication information is used to indicate whether to allow the terminal to report the working cell information of the second terminal identifier through the first terminal identifier; and the second indication information is used to indicate whether the network side device supports receiving of the working cell information of the second terminal identifier that is reported through the first terminal identifier.

Optionally, the preset condition further includes at least one of:
it is detected that a working cell of the second terminal identifier has changed or will change;
it is detected that a working cell of the first terminal identifier has changed or will change;
it is detected that a connection state of the second terminal identifier has changed or will change; or
it is detected that a connection state of the first terminal identifier has changed or will change.

Optionally, the processor 610 is configured to:
after working cell information of a second terminal identifier of N terminal identifiers is reported to a network side device through a first terminal identifier of the N terminal identifiers, start a target timer;
where during operation of the target timer, the terminal stops reporting the working cell information of the second terminal identifier to the network side device through the first terminal identifier of the N terminal identifiers.

Optionally, the working cell information of the second terminal identifier includes at least one of:
a frequency corresponding to the working cell of the second terminal identifier;
a band corresponding to the working cell of the second terminal identifier;
a band combination corresponding to the working cell of the second terminal identifier;
a cell identifier of the working cell of the second terminal identifier;
a cell group identifier of a cell group of the working cell of the second terminal identifier;
a terminal identifier corresponding to the working cell of the second terminal identifier;
a radio technology identifier corresponding to the working cell of the second terminal identifier; or synchronization status information of the working cell of the second terminal identifier.

Optionally, the radio frequency unit 601 is further configured to:
report, to the network side device, working capability information of M terminal identifiers of the N terminal identifiers supported by the terminal;
where M is an integer greater than 1 and less than or equal to N.

Optionally, the working capability information of M terminal identifiers of the N terminal identifiers supported by the terminal includes at least one of:
a combination of radio network technologies supported by the terminal; or a combination of bands supported by the terminal; and a combination of frequencies supported by the terminal.

Optionally, a radio network technology type of the combination of radio network technologies includes at least one of:
  code division multiple access CDMA; CDMA2000; GSM/EDGE radio access network GERAN; universal terrestrial radio access network UTRAN; evolved UTRAN; fifth-generation new radio; radio network Wi-Fi; or Bluetooth.

Optionally, the combination of bands includes at least one of a combination of synchronous bands or a combination of non-synchronous bands.

It should be noted that the terminal 600 in this embodiment can implement each process performed by the terminal in the method embodiments of the present disclosure, and achieve same beneficial effects. To avoid repetition, details are not described herein again.

It should be understood that, in this embodiment of the present disclosure, the radio frequency unit 601 may be configured to receive and transmit information, or receive and transmit signals during a call. For example, the radio frequency unit 601 receives downlink data from a base station, and transmits the downlink data to the processor 610 for processing; and in addition, transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 can also communicate with another device through a wireless communications system and network.

The terminal provides wireless broadband Internet access for the user by using the network module 602, for example, helping the user to send and receive an e-mail, browse a web page, and access streaming media.

The audio output unit 603 can convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a speaker, a buzzer, a telephone receiver, and the like.

The input unit 604 is configured to receive audio or video signals. The input unit 604 may include a graphics processing unit (GPU) 6041 and a microphone 6042. The graphics processing unit 6041 processes image data of a static picture or a video obtained by an image capturing apparatus (for example, a camera) in a video capturing mode or an image capturing mode. A processed image frame can be displayed on the display unit 606. The image frame processed by the graphics processing unit 6041 may be stored in the memory 609 (or another storage medium) or sent by using the radio frequency unit 601 or the network module 602. The microphone 6042 can receive sound, and can process such sound into audio data. Processed audio data may be converted, in a call mode, into a format that can be sent to a mobile communication base station by using the radio frequency unit 601 for output.

The terminal 600 further includes at least one sensor 605, for example, a light sensor, a motion sensor, and another sensor. For example, the light sensor includes an ambient light sensor and a proximity sensor, where the ambient light sensor can adjust brightness of a display panel 6061 based on brightness of ambient light, and the proximity sensor can turn off the display panel 6061 and/or backlight when the terminal 600 is moved towards the ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information entered by a user or information provided for the user. The display unit 606 may include the display panel 6061, and the display panel 6061 may be configured in a form of a liquid crystal display (LCD), an organic light-emitting diode (OLED), or the like.

The user input unit 607 can be configured to receive input numeric or character information, and generate key signal inputs related to user settings and function control of the terminal. For example, the user input unit 607 includes a touch panel 6071 and other input devices 6072. The touch panel 6071, also called a touch screen, can collect a touch operation of the user on or near the touch panel 6071 (For example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 610, receives a command sent by the processor 610, and executes the command In addition, the touch panel 6071 can be implemented in various types such as resistive, capacitive, infrared, and surface acoustic waves. In addition to the touch panel 6071, the user input unit 607 may further include the other input devices 6072. For example, the another input device 6072 may include, but not limited to, a physical keyboard, a function key (for example, a volume control key or a switch key), a trackball, a mouse, and a joystick. Details are not described herein.

Optionally, the touch panel 6071 may cover the display panel 6061. When detecting the touch operation on or near the touch panel 6071, the touch panel 6071 transmits the touch operation to the processor 610 to determine a type of a touch event, and then the processor 610 provides corresponding visual output on the display panel 6061 based on the type of the touch event. Although in FIG. 6, the touch panel 6071 and the display panel 6061 are configured as two independent components to implement input and output functions of the terminal, in some embodiments, the touch panel 6071 and the display panel 6061 can be integrated to implement the input and output functions of the terminal. Details are not limited herein.

The interface unit 608 is an interface for connecting an external apparatus to the terminal 600. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 608 may be configured to receive an input (for example, data information or power) from an external apparatus and transmit the received input to one or more elements in the terminal 600, or transmit data between the terminal 600 and the external apparatus.

The memory 609 may be configured to store software programs and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on the use of the mobile phone, and the like. In addition, the memory 609 may include a high-speed random access memory or a nonvolatile memory, for example, at least one disk storage device, a flash memory, or another volatile solid-state storage device.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 can include one or more processing units. Preferably, the processor 610 can be integrated with an application processor and a modem processor. The application processor mainly processes the operating system, the user interface, applications, etc. The modem processor mainly processes wireless communication. It can be understood that the foregoing modem processor may not be integrated into the processor 610.

The terminal 600 may further include the power supply 611 (such as a battery) that supplies power to each component. Preferably, the power supply 611 may be logically connected to the processor 610 by using a power management system, so as to implement functions such as charging, discharging, and power consumption management by using the power management system.

In addition, the terminal 600 includes some function modules that are not shown. Details are not described herein.

Preferably, an embodiment of the present disclosure further provides a terminal, including a processor 610, a memory 609, and a computer program that is stored in the memory 609 and that can run on the processor 610. When executing the computer program, the processor 610 implements the foregoing processes of the receiving method embodiment and a same technical effect can be achieved. To avoid repetition, details are not described herein again.

Figure 7:
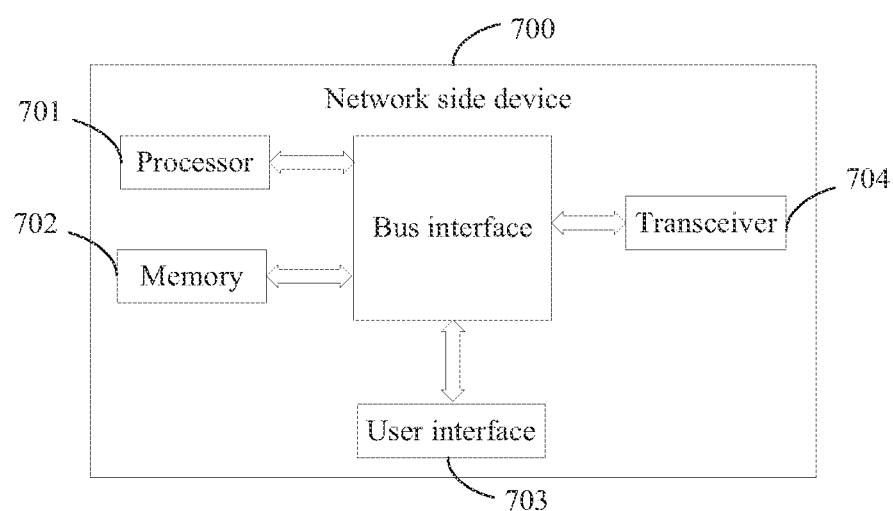
FIG. 7 is a structural diagram 2 of a network side device according to an embodiment of the present disclosure.

FIG. 7 is a second structural diagram of a network side device according to an embodiment of the present disclosure. As shown in FIG. 7, the network side device 700 includes: a processor 701, a memory 702, a user interface 703, a transceiver 704, and a bus interface.

In this embodiment of the present disclosure, the network side device 700 further includes a computer program stored in the memory 702 and executable on the processor 701. When the computer program is executed by the processor 701, the following step is implemented:

receiving working cell information of a second terminal identifier of N terminal identifiers that is reported by a terminal through a first terminal identifier of the N terminal identifiers of the terminal, where N is an integer greater than 1.

Optionally, when the computer program is executed by the processor 701, the following steps may be further performed:

before working cell information of a second terminal identifier of N terminal identifiers that is reported by a terminal through a first terminal identifier of the N terminal identifiers of the terminal is received, sending first indication information to the terminal, where the first indication information indicates allowing the terminal to report the working cell information of the second terminal identifier through the first terminal identifier; and/or before working cell information of a second terminal identifier of N terminal identifiers that is reported by a terminal through a first terminal identifier of the N terminal identifiers of the terminal is received, sending second indication information to the terminal, where the second indication information indicates that the network side device supports receiving of the working cell information of the second terminal identifier that is reported through the first terminal identifier.

Optionally, the working cell information of the second terminal identifier includes at least one of:

a frequency corresponding to the working cell of the second terminal identifier;

a band corresponding to the working cell of the second terminal identifier;

a band combination corresponding to the working cell of the second terminal identifier;

a cell identifier of the working cell of the second terminal identifier;

a cell group identifier of a cell group of the working cell of the second terminal identifier;

a terminal identifier corresponding to the working cell of the second terminal identifier;

a radio technology identifier corresponding to the working cell of the second terminal identifier; or synchronization status information of the working cell of the second terminal identifier.

Optionally, when the computer program is executed by the processor 701, the following steps may be further performed:

receiving working capability information of M terminal identifiers of the N terminal identifiers supported by the terminal; where the working capability information is reported by the terminal;

where M is an integer greater than 1 and less than or equal to N.

Optionally, the working capability information of M terminal identifiers of the N terminal identifiers supported by the terminal includes at least one of:

a combination of radio network technologies supported by the terminal;

a combination of bands supported by the terminal; or a combination of frequencies supported by the terminal.

Optionally, a radio network technology type of the combination of radio network technologies includes at least one of:

code division multiple access CDMA; CDMA2000; GSM/EDGE radio access network GERAN; universal terrestrial radio access network UTRAN; evolved UTRAN; fifth-generation new radio; radio network Wi-Fi; or Bluetooth.

Optionally, the combination of bands includes at least one of a combination of synchronous bands or a combination of non-synchronous bands.

Optionally, the network side device is a source network side device; and

When the computer program is executed by the processor 701, the following steps may be further performed:

a forwarding module, configured to: after working cell information of a second terminal identifier of N terminal identifiers that is reported by a terminal through a first terminal identifier of the N terminal identifiers of the terminal is received, forward the working cell information of the second terminal identifier of the N terminal identifiers to a target network side device.

In FIG. 7, the bus architecture may include any number of interconnected buses and bridges, which are connected together by various circuits of one or more processors represented by the processor 701 and a memory represented by the memory 702. The bus architecture may further link various other circuits such as a peripheral device, a voltage regulator, and a power management circuit together. These are all well-known in the art, and therefore are not further described in this specification. The bus interface provides an interface. The transceiver 704 may be a plurality of elements, that is, include a transmitter and a receiver, and provide units for communication with various other apparatuses on a transmission medium. For different user equipment, the user interface 703 may alternatively be an interface for externally and internally connecting a required device. The connected device includes, but not limited to, a keypad, a display, a loudspeaker, a microphone, a joystick, and the like.

The processor 701 is responsible for management of a bus architecture and general processing. The memory 702 may store data used when the processor 2601 performs an operation.

The network side device 700 can implement each process implemented by the network side device in the foregoing method embodiments. To avoid repetition, details are not described herein again.

An embodiment of the present disclosure further provides a non-transitory computer-readable storage medium. The non-transitory computer-readable storage medium stores a computer program, and when executing the computer program, a processor implements the foregoing processes of the connection management method embodiment and a same technical effect can be achieved. To avoid repetition, details are not described herein again. The non-transitory computer readable storage medium may be a read-only memory (ROM), a random access memory (RAM), a magnetic disk, a compact disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A connection management method, applied to a terminal, wherein the terminal comprises N terminal identifiers, N is an integer greater than 1, and the method comprises:
   reporting working cell information of a second terminal identifier of the N terminal identifiers to a network side device through a first terminal identifier of the N terminal identifiers; wherein
   the reporting of the working cell information of the second terminal identifier of the N terminal identifiers to the network side device through the first terminal identifier of the N terminal identifiers comprises:
   when a preset condition is met, reporting the working cell information of the second terminal identifier to the network side device through the first terminal identifier of the N terminal identifiers; wherein
   the preset condition comprises: allowing reporting the working cell information of the second terminal identifier of the N terminal identifiers through the first terminal identifier; wherein
   the preset condition is determined based on a number of terminal identifiers of the N terminal identifiers that is connected to the network side device and a number of terminal identifiers of the N terminal identifiers that will be connected to the network side device.

2. The method according to claim 1, wherein the preset condition is configured by the network side device and/or predefined by a protocol.

3. The method according to claim 2, wherein in a case where the preset condition is configured by the network side device, before the reporting working cell information of a second terminal identifier to a network side device through a first terminal identifier of the N terminal identifiers, the method further comprises:
   receiving first indication information and/or second indication information sent by the network side device;
   wherein the first indication information is used to indicate whether to allow the terminal to report the working cell information of the second terminal identifier through the first terminal identifier; and the second indication information is used to indicate whether the network side device supports receiving of the working cell information of the second terminal identifier that is reported through the first terminal identifier.

4. The method according to claim 1, wherein the preset condition further comprises at least one of:
   detecting that a working cell of the second terminal identifier has changed or will change;

detecting that a working cell of the first terminal identifier has changed or will change;
detecting that a connection state of the second terminal identifier has changed or will change; or
detecting that a connection state of the first terminal identifier has changed or will change.

5. The method according to claim 1, wherein after the reporting of the working cell information of the second terminal identifier of the N terminal identifiers to the network side device through the first terminal identifier of the N terminal identifiers, the method further comprises:
starting a target timer;
wherein during operation of the target timer, the terminal stops reporting the working cell information of the second terminal identifier to the network side device through the first terminal identifier of the N terminal identifiers.

6. The method according to claim 1, wherein the working cell information of the second terminal identifier comprises at least one of:
a frequency corresponding to the working cell of the second terminal identifier;
a band corresponding to the working cell of the second terminal identifier;
a band combination corresponding to the working cell of the second terminal identifier;
a cell identifier of the working cell of the second terminal identifier;
a cell group identifier of a cell group of the working cell of the second terminal identifier;
a terminal identifier corresponding to the working cell of the second terminal identifier;
a radio technology identifier corresponding to the working cell of the second terminal identifier; or
synchronization status information of the working cell of the second terminal identifier.

7. The method according to claim 1, further comprising:
reporting, to the network side device, working capability information of M terminal identifiers of the N terminal identifiers supported by the terminal;
wherein M is an integer greater than 1 and less than or equal to N.

8. The method according to claim 7, wherein the working capability information of M terminal identifiers of the N terminal identifiers supported by the terminal comprises at least one of:
a combination of radio network technologies supported by the terminal;
a combination of bands supported by the terminal; or
a combination of frequencies supported by the terminal.

9. The method according to claim 8, wherein a radio network technology type of the combination of radio network technologies comprises at least one of:
code division multiple access (CDMA); CDMA2000; GSM/EDGE radio access network (GERAN); universal terrestrial radio access network (UTRAN); evolved UTRAN; fifth-generation new radio; radio network Wi-Fi; or Bluetooth.

10. The method according to claim 8, wherein the combination of bands comprises at least one of a combination of synchronous bands or a combination of non-synchronous bands.

11. A terminal, comprising a processor, a memory, and a computer program stored in the memory and executable on the processor, wherein the computer program, when executed by the processor, causes the terminal to perform:
reporting working cell information of a second terminal identifier of N terminal identifiers to a network side device through a first terminal identifier of the N terminal identifiers, wherein the terminal comprises the N terminal identifiers, N is an integer greater than 1;
wherein
the computer program, when executed by the processor, causes the terminal to perform:
when a preset condition is met, reporting the working cell information of the second terminal identifier to the network side device through the first terminal identifier of the N terminal identifiers; wherein
the preset condition comprises: allowing reporting the working cell information of the second terminal identifier of the N terminal identifiers through the first terminal identifier; wherein
the preset condition is determined based on a number of terminal identifiers of the N terminal identifiers that is connected to the network side device and a number of terminal identifiers of the N terminal identifiers that will be connected to the network side device.

12. The terminal according to claim 11, wherein the preset condition is configured by a network side device and/or predefined by a protocol.

13. The terminal according to claim 12, wherein in a case where the preset condition is configured by the network side device, before the terminal perform the reporting working cell information of a second terminal identifier to a network side device through a first terminal identifier of the N terminal identifiers, the computer program, when executed by the processor, causes the terminal to perform:
receiving first indication information and/or second indication information sent by the network side device;
wherein the first indication information is used to indicate whether to allow the terminal to report the working cell information of the second terminal identifier through the first terminal identifier; and the second indication information is used to indicate whether the network side device supports receiving of the working cell information of the second terminal identifier that is reported through the first terminal identifier.

14. The terminal according to claim 11, wherein the preset condition further comprises at least one of:
detecting that a working cell of the second terminal identifier has changed or will change;
detecting that a working cell of the first terminal identifier has changed or will change;
detecting that a connection state of the second terminal identifier has changed or will change; or
detecting that a connection state of the first terminal identifier has changed or will change.

15. The terminal according to claim 11, wherein after the reporting the working cell information of the second terminal identifier of the N terminal identifiers to the network side device through the first terminal identifier of the N terminal identifiers, the computer program, when executed by the processor, causes the terminal to perform:
starting a target timer;
wherein during operation of the target timer, the terminal stops reporting the working cell information of the second terminal identifier to the network side device through the first terminal identifier of the N terminal identifiers.

16. A network side device, comprising a processor, a memory, and a computer program stored in the memory and executable on the processor, wherein the computer program, when executed by the processor, causes the network side device to perform:
> receiving working cell information of a second terminal identifier of N terminal identifiers that is reported by a terminal through a first terminal identifier of the N terminal identifiers of the terminal, wherein N is an integer greater than 1; wherein
>
> the computer program, when executed by the processor, causes the network side device to perform:
>
> receiving the working cell information of the second terminal identifier of the N terminal identifiers that is reported by the terminal when a preset condition is met through the first terminal identifier of the N terminal identifiers of the terminal; wherein
>
> the preset condition comprises that the working cell information of the second terminal identifier of the N terminal identifiers is allowed to be reported through the first terminal identifier; wherein
>
> the preset condition is determined based on a number of terminal identifiers of the N terminal identifiers that is connected to the network side device and a number of terminal identifiers of the N terminal identifiers that will be connected to the network side device.

* * * * *